US012576720B2

(12) United States Patent
Bolle et al.

(10) Patent No.: US 12,576,720 B2
(45) Date of Patent: Mar. 17, 2026

(54) SYSTEM AND METHOD FOR OPERATING A VEHICLE WITH ELECTRIC POWER TAKE-OFF

(71) Applicant: Dana Belgium N.V., Bruges (BE)

(72) Inventors: Korneel Bolle, St-Amandsberg (BE); Stijn Goossens, Erpe-Mere (BE); Bert Hannon, Bruges (BE); Ariprasaath Chandrasekaran, Bruges (BE)

(73) Assignee: DANA BELGIUM, Bruges (BE)

( * ) Notice: Subject to any disclaimer, the term of this patent is extended or adjusted under 35 U.S.C. 154(b) by 115 days.

(21) Appl. No.: 18/439,541

(22) Filed: Feb. 12, 2024

(65) Prior Publication Data

US 2025/0256579 A1 Aug. 14, 2025

(51) Int. Cl.
B60L 1/00 (2006.01)
B60K 17/02 (2006.01)
B60K 17/28 (2006.01)
B60L 15/20 (2006.01)

(52) U.S. Cl.
CPC ................ B60L 1/00 (2013.01); B60K 17/02 (2013.01); B60K 17/28 (2013.01); B60L 15/2054 (2013.01); B60L 2240/12 (2013.01); B60L 2240/50 (2013.01)

(58) Field of Classification Search
CPC .... B60L 1/00; B60L 15/2054; B60L 2240/12; B60L 2240/50; B60K 17/02; B60K 17/28
See application file for complete search history.

(56) References Cited

U.S. PATENT DOCUMENTS

2024/0217343 A1* 7/2024 Ono ....................... B62D 49/06

* cited by examiner

*Primary Examiner* — Alan D Hutchinson
(74) *Attorney, Agent, or Firm* — McCoy Russell LLP

(57) ABSTRACT

Methods and systems for controlling a power take-off and engagement of an electric machine of an electric vehicle are described. In one example, a power take-off and engagement of a disconnect clutch are controlled in response to vehicle speed and tractive effort. A first electric machine is fixable coupled to a gear set of a transmission and the driveline disconnect clutch may selectively couple a second electric machine to the gear set.

20 Claims, 5 Drawing Sheets

SYSTEM AND METHOD FOR OPERATING A VEHICLE WITH ELECTRIC POWER TAKE-OFF

TECHNICAL FIELD

The present disclosure relates to operating an electric vehicle that includes a power take-off.

BACKGROUND AND SUMMARY

Internal combustion engines may be configured to propel a vehicle and provide power to a power take-off device. The power take-off device may supply power to a system that does not operate to deliver power to vehicle wheels. For example, the power take-off may supply mechanical power to drive a pump that pumps hydraulic fluid to operate hydraulic cylinders. Further, the power take-off may rotate a mixing device and/or supply power off-board the vehicle that includes the power take-off. However, power take-offs for electric vehicles provide different challenges than those power take-offs that are powered via an internal combustion engine. For example, electric vehicle power take-offs may not provide rotational power in a desired direction when an electric vehicle is traveling in a forward or a reverse gear. Further, a power take-off of an electric vehicle may not rotate at a desirable speed when a vehicle that includes the power take off device is traveling at a low speed. For at least these reasons, it may be desirable to reexamine power take-offs for electric vehicles.

The inventors herein have recognized the above-mentioned issues and have developed an electric propulsion system, comprising: a first electric machine; a second electric machine; a transmission, the transmission mechanically coupled to one or more rotatable wheels and the first electric machine; a disconnect clutch configured to selectively couple the second electric machine to the transmission; a power take-off configured to supply rotational mechanical power to a device; a power take-off disconnect clutch configured to selectively couple the second electric machine to the power take-off; and one or more controllers, the one or more controllers including executable non-transitory executable instructions that cause the controller to operate the power take-off disconnect clutch and the disconnect clutch.

By building a propulsion system that includes a disconnect clutch and a power take-off disconnect clutch, it may be possible to control a direction of power take-off rotation and speed independent of vehicle speed. Further, if operation of the power take-off is not requested or desired, an electric machine that selectively provides mechanical power to a power take-off device may supply tractive effort to a vehicle powertrain. Further still, during some conditions, the electric machine may provide power to the power take-off and the vehicle powertrain. As such, the capabilities of the electric machine may be enhanced.

The present description may provide several advantages. In particular, the approach may provide enhanced control for a power take-off of an electric machine. Further, the approach may enhance capability of an electric machine and provide independent control over a power take-off that may deliver power to a device that is external from a vehicle powertrain. Additionally, the approach provides for automated control over a power take-off device based on vehicle operating conditions.

It is to be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not restricted to implementations that solve any disadvantages noted above or in any part of this disclosure.

DETAILED DESCRIPTION

Figure 1:
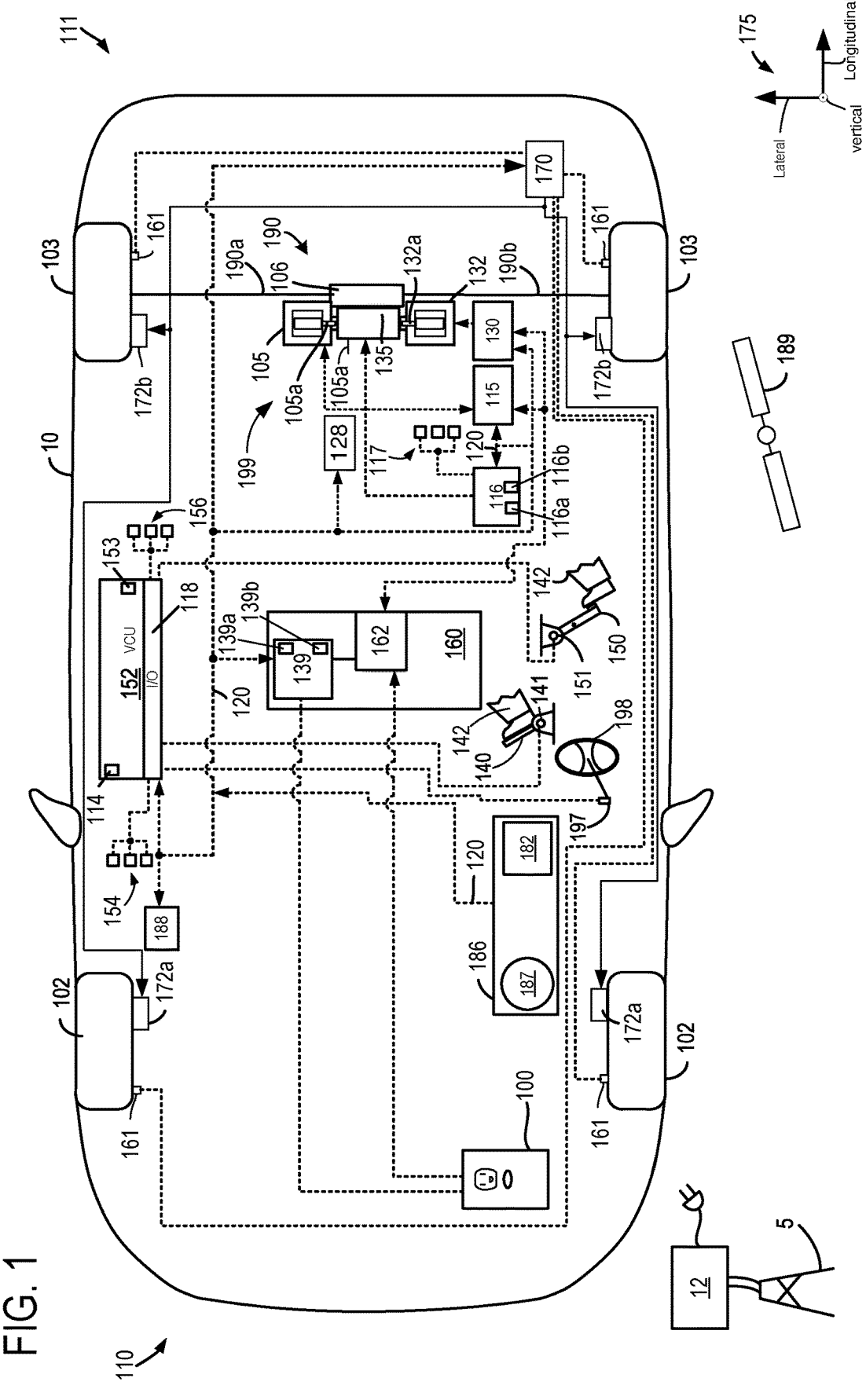
FIG. 1 is an illustration of an example vehicle that includes an electric vehicle propulsion system.
Figure 2:
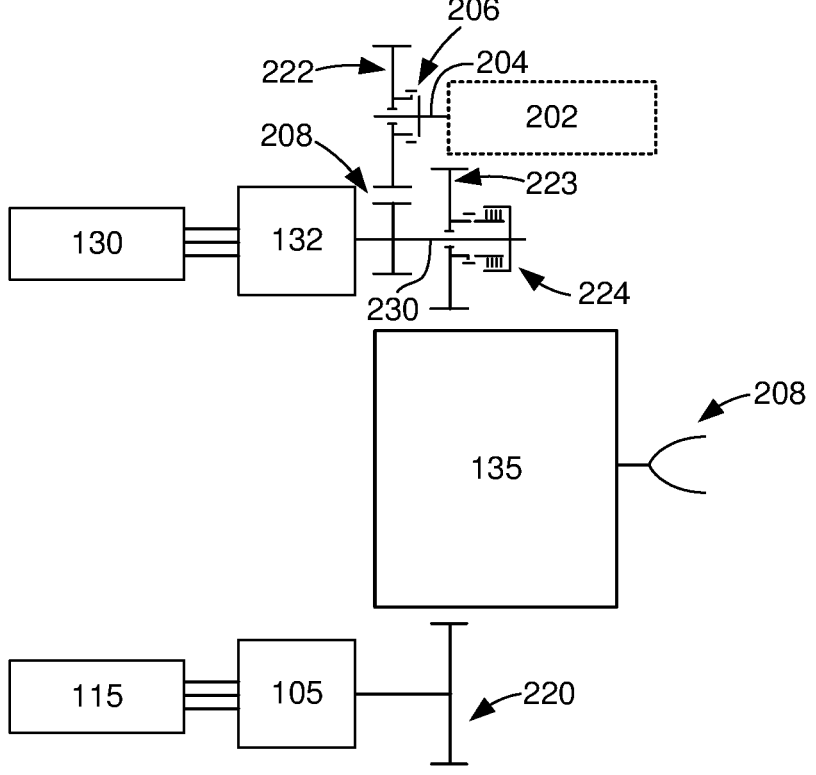
FIG. 2 shows a stick diagram of one example step gear ratio transmission configuration that includes a power take-off device.
Figure 3:
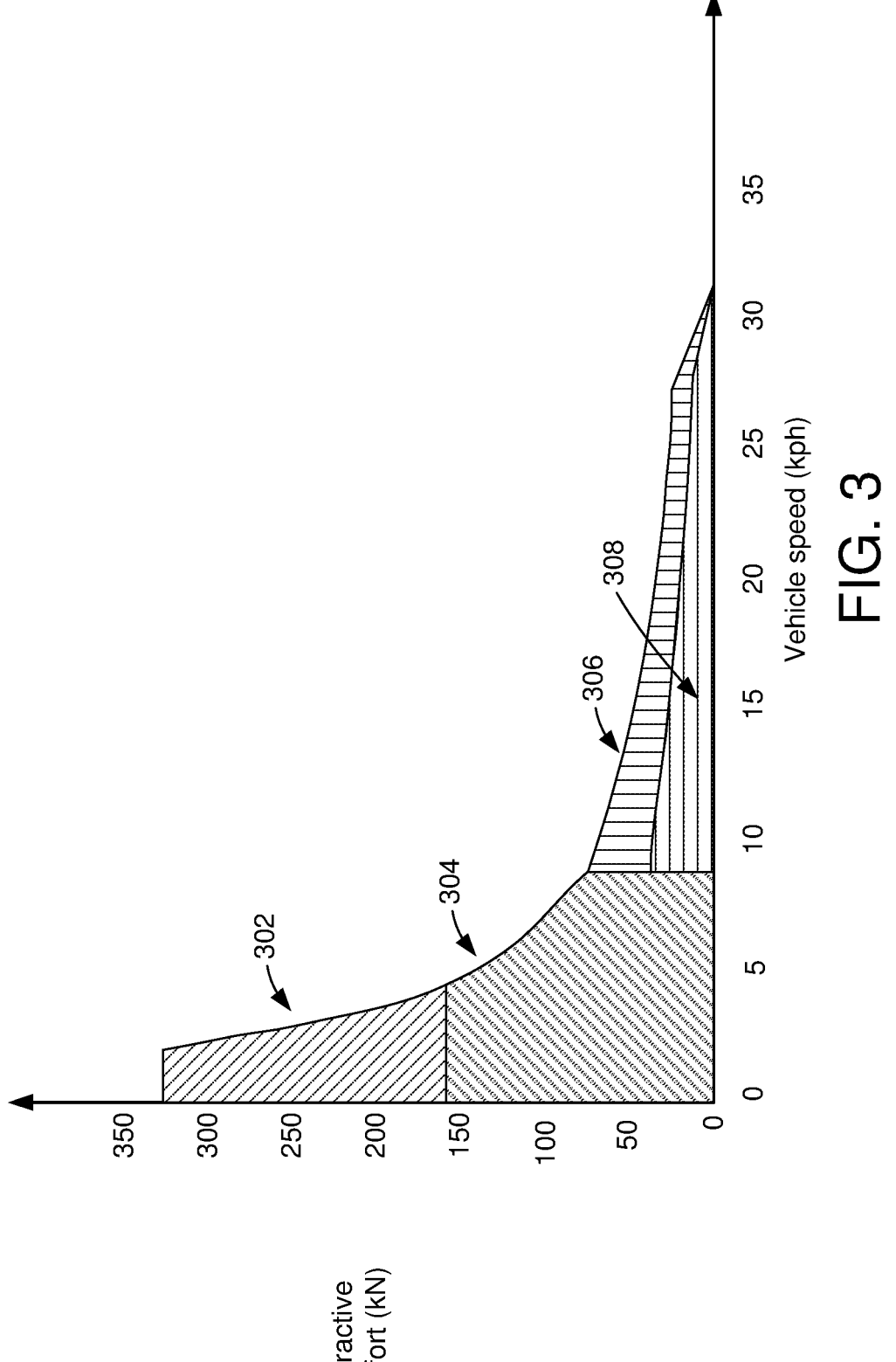
FIG. 3 shows powertrain operating modes according to a relationship between tractive effort and vehicle speed.

A method and system for providing power take-off output and tractive effort for an electric vehicle are described. The electric vehicle may include a two-speed transmission (e.g., a transmission with two forward gear ratios) or a transmission having more than two gear ratios. The electric vehicle may include two separate and independent electric machines as shown in FIGS. 1 and 2. The electric machines and power power-take off may operate in different modes according to a relationship between tractive effort and vehicle speed as shown in FIG. 3. The electric machines and transmission may be operated according to the method that is illustrated in the block diagram of FIG. 4. The electric vehicle may provide tractive effort according to which of the transmissions gears are engaged as shown in FIG. 5.

FIG. 1 illustrates an example vehicle propulsion system 199 for vehicle 10. In FIG. 1, mechanical connections between the various components are illustrated as solid lines, whereas electrical connections between various components are illustrated as dashed lines. Vehicle front end is indicated at 110 and vehicle rear end is indicated at 111. Vehicle 10 travels in a forward direction when vehicle front end 110 leads movement of vehicle 10. Vehicle 10 travels in a reverse direction when vehicle rear end 111 leads movement of vehicle 10. In this example, vehicle 10 is a rear wheel drive vehicle, but in other examples, vehicle 10 may be a four-wheel drive or front wheel drive vehicle.

Vehicle propulsion system 199 includes a first propulsion source 105 (e.g., an electric machine, such as a motor) and a second electric machine 132. In one example, propulsion sources 105 and 132 may be synchronous or induction electric machines that may operate as motor or generators. In other examples, propulsion sources 105 and 132 may be a direct current (DC) machine. Second electric machine 132 may selectively provide power to a power take off 129 according to user input to power take off interface 128 as shown in greater detail in FIG. 2. Vehicle propulsion system 199 also includes a transmission 135. The propulsion sources 105 and 132 are fastened to the transmission 135. Propulsion sources 105 and 132 deliver power from their respective rotors 105a and 132a to transmission 135. Transmission 135 may be mechanically coupled to differential gears 106. Differential gears 106 may be coupled to two axle shafts, including a first or right axle shaft 190a and a second or left axle shaft 190*b*. Vehicle 10 further includes front wheels 102 and rear wheels 103.

The transmission 135 may be referred to as a step ratio transmission and it may be configured as shown in greater detail in FIG. 2. Transmission 135 may include one or more clutch actuators (not shown) to shift one or more clutches. Electric power inverter 115 is electrically coupled to propulsion source 105 to convert DC power to alternating current (AC) and vise-versa. Likewise, electric power inverter 130 is electrically coupled to propulsion source 132 to convert DC power to alternating current (AC) and vise-versa. Powertrain controller 116 is electrically coupled to sensors 117 and actuators of vehicle propulsion system 199. For example, sensors 117 may include, but are not limited to inverter switch temperature sensors, electric machine winding temperature sensors, bus bar temperature sensors, etc.

Transmission 135 may transfer mechanical power to or receive mechanical power from differential gears 106. Differential gears 106 may transfer mechanical power to or receive mechanical power from rear wheels 103 via right axle shaft 190*a* and left axle shaft 190*b*. Propulsion sources 105 and 132 may consume alternating current (AC) electrical power provided via their respective electric power inverters 115 and 130. Alternatively, propulsion source 105 and 130 may provide AC electrical power to their respective electric power inverters 115 and 130. Electric power inverters 115 and 130 may be provided with high voltage direct current (DC) power from battery 160 (e.g., a traction battery, which also may be referred to as an electric energy storage device or battery pack). Electric power inverters 115 and 130 may convert the DC electrical power from battery 160 into AC electrical power for propulsion sources 105 and 132. Alternatively, electric power inverters 115 and 130 may be provided with AC power from their respective propulsion sources 105 and 132. Electric power inverters 115 and 130 may convert the AC electrical power from their respective propulsion sources 105 and 132 into DC power to store in battery 160.

Propulsion sources 105 and 132 may transfer mechanical power to or receive mechanical power from transmission 135. As such, transmission 135 may be a multi-speed gear set that may shift between gear ratios when commanded via powertrain controller 116. Powertrain controller 116 includes a processor 116*a* and memory 116*b*. Memory 116*b* (e.g., storage media) may include read exclusive memory, random access memory, and keep alive memory. The memory may be programmed with computer readable data representing instructions that are executable by a processor for performing the methods and control techniques described herein as well as other variants that are anticipated but not specifically listed. As such, control techniques, methods, and the like expanded upon herein may be stored as instructions in non-transitory memory.

Battery 160 may periodically receive electrical energy from a power source such as a stationary power grid 5 residing external to the vehicle (e.g., not part of the vehicle). As a non-restricted example, vehicle propulsion system 199 may be configured as a plug-in electric vehicle (EV), whereby electrical energy may be supplied to battery 160 via the stationary power grid 5 and charging station 12. Electric charge may be delivered to battery 160 via plug receptacle 100.

Battery 160 may include a BMS controller 139 (e.g., a battery management system controller) and an electrical power distribution box 162. BMS controller 139 may provide charge balancing between energy storage elements (e.g., battery cells) and communication with other vehicle controllers (e.g., vehicle control unit 152). BMS controller 139 includes a core processor 139*a* and memory 139*b* (e.g., random-access memory, read-exclusive memory, and keep-alive memory).

Vehicle 10 may include a vehicle control unit (VCU) 152 that may communicate with electric power inverter 115, electric power inverter 130, powertrain controller 116, friction or foundation caliper controller 170, global positioning system (GPS) 188, BMS controller 139, and dashboard 186 and components included therein via controller area network (CAN) 120. VCU 152 includes memory 114, which may include read-exclusive memory (ROM or non-transitory memory) and random access memory (RAM). VCU also includes a digital processor or central processing unit (CPU) 153, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156. Sensors 154 may include but are not restricted to lateral accelerometers, longitudinal accelerometers, yaw rate sensors, inclinometers, temperature sensors, battery voltage and current sensors, and other sensors described herein. Additionally, sensors 154 may include steering angle sensor 197, driver demand pedal position sensor 141, vehicle range finding sensors including radio detection and ranging (RADAR), light detection and ranging (LIDAR), sound navigation and ranging (SONAR), and caliper application pedal position sensor 151. Actuators may include but are not constrained to inverters, transmission controllers, display devices, human/machine interfaces, friction caliper systems, and battery controller described herein.

Driver demand pedal position sensor 141 is shown coupled to driver demand pedal 140 for determining a degree of application of driver demand pedal 140 by human 142. Caliper application pedal position sensor 151 is shown coupled to caliper application pedal 150 for determining a degree of application of caliper application pedal 150 by human 142. Steering angle sensor 197 is configured to determine a steering angle according to a position of steering wheel 198.

Vehicle propulsion system 199 is shown with a global position determining system 188 that receives timing and position data from one or more GPS satellites 189. Global positioning system may also include geographical maps in ROM for determining the position of vehicle 10 and features of roads that vehicle 10 may travel on.

Vehicle propulsion system 199 may also include a dashboard 186 that an operator of the vehicle may interact with. Dashboard 186 may include a display system 187 configured to display information to the vehicle operator. Display system 187 may comprise, as a non-restricting example, a touchscreen, or human machine interface (HMI), display which enables the vehicle operator to view graphical information as well as input commands. In some examples, display system 187 may be connected wirelessly to the internet (not shown) via VCU 152. As such, in some examples, the vehicle operator may communicate via display system 187 with an internet site or software application (app) and VCU 152.

Dashboard 186 may further include an operator interface 182 via which the vehicle operator may adjust the operating status of the vehicle. Specifically, the operator interface 182 may be configured to activate and/or deactivate operation of the vehicle driveline (e.g., propulsion source 105) based on an operator input. Further, an operator may request an axle mode (e.g., park, reverse, neutral, drive) via the operator interface. Various examples of the operator interface 182 may include interfaces that utilize a physical apparatus, such as a key, that may be inserted into the operator interface 182 to activate the vehicle propulsion system 199, including propulsion sources 105 and 132, to turn on the vehicle 10. The apparatus may be removed to shut down the transmission 135 and propulsion sources 105 and 132 to turn off vehicle 10. Propulsion sources 105 and 130 may be activated via supplying electric power to propulsion sources 105 and 132 as well as electric power inverters 115 and 130. Propulsion sources 105 and 132 may be deactivated by ceasing to supply electric power to propulsion sources 105 and 132 as well as electric power inverters 115 and 132. Still other examples may additionally or optionally use a start/stop button that is manually pressed by the operator to start or shut down the propulsion sources 105 and 132 to turn the vehicle on or off. In other examples, a remote electrified axle or electric machine start may be initiated remote computing device (not shown), for example a cellular telephone, or smartphone-based system where a user's cellular telephone sends data to a server and the server communicates with the vehicle control unit 152 to activate the inverters 115 and 130 as well as propulsion sources 105 and 132. Spatial orientation of vehicle 10 is indicated via axes 175.

Vehicle 10 is also shown with a foundation or friction caliper controller 170. Friction caliper controller 170 may selectively apply and release friction calibers (e.g., 172*a* and 172*b*) via allowing hydraulic fluid to flow to the friction calipers. The friction calipers may be applied and released so as to reduce locking of the friction calipers to front wheels 102 and rear wheels 103. Wheel position or speed sensors 161 may provide wheel speed data to friction caliper controller 170. Vehicle propulsion system 199 may provide torque to rear wheels 103 to propel vehicle 10.

A human or autonomous driver 142 may request a driver demand wheel torque, or alternatively a driver demand tractive effort, via applying driver demand pedal 140 or via supplying a driver demand wheel torque/tractive effort request to vehicle control unit 152. Vehicle control unit 152 may then demand a torque or tractive effort from propulsion sources 105 and 132 via commanding powertrain controller 116. Powertrain controller 116 may command electric power inverters 115 and 130 to deliver the driver demand wheel torque/tractive effort via electrified axle 190 and propulsion sources 105 and 132. Electric power inverters 115 and 130 may convert DC electrical power from battery 160 into AC power and supply the AC power to propulsion sources 105 and 132. Propulsion sources 105 and 132 rotate and transfer torque/power to transmission 135. Transmission 135 may supply torque from propulsion sources 105 and 132 to differential gears 106, and differential gears 106 transfer torque from propulsion sources 105 and 132 to rear wheels 103 via axle shafts 190*a* and 190*b*.

During conditions when the driver demand pedal is fully released, vehicle control unit 152 may request a small negative or regenerative power to gradually slow vehicle 10 when a speed of vehicle 10 is greater than a threshold speed. The amount of regenerative power requested may be a function of driver demand pedal position, battery state of charge (SOC), vehicle speed, and other conditions. If the driver demand pedal 140 is fully released and vehicle speed is less than a threshold speed, vehicle control unit 152 may request a small amount of positive torque/power (e.g., propulsion torque) from propulsion source 105, which may be referred to as creep torque or power. The creep torque or power may allow vehicle 10 to remain stationary when vehicle 10 is on a small positive grade.

The human or autonomous driver may also request a negative or regenerative driver demand slowing torque, or alternatively a driver demand slowing power, via applying caliper pedal 150 or via supplying a driver demand slowing power request to vehicle control unit 152. Vehicle control unit 152 may request that a first portion of the driver demanded slowing power be generated via propulsion source 105 via commanding powertrain controller 116. Additionally, vehicle control unit 152 may request that a portion of the driver demanded slowing power be provided via friction calipers 172*a* and 172*b* via commanding friction caliper controller 170 to provide a second portion of the driver requested slowing power.

After vehicle control unit 152 determines the slowing power request, vehicle control unit 152 may command powertrain controller 116 to deliver the portion of the driver demand slowing power allocated to propulsion sources 105 and 132. Propulsion sources 105 and 132 may convert the vehicle's kinetic energy into AC power.

Powertrain controller 116 includes predetermined transmission gear shift schedules whereby fixed ratio gears of transmission 135 may be selectively engaged and disengaged. Shift schedules stored in powertrain controller 116 may select gear shift points or events as a function of driver demand wheel torque and vehicle speed.

Turning now to FIG. 2, a stick diagram of vehicle propulsion system 199 is shown. In this example, vehicle propulsion system 199 includes a transmission 135 that is a step gear ratio transmission with two gear ratios (e.g., a first lower gear ratio and a second higher gear ratio). In other examples, transmission 135 may include additional gear ratios.

Transmission 135 is mechanically fixedly coupled to first electric machine 105 via gear 220. Additionally, transmission 135 is mechanically fixedly coupled to gear 223, but gear 223 may be selectively mechanically coupled to second electric machine 132 via disconnect clutch 224. In particular, gear 223 is supported via shaft 230, but it may rotate freely with respect to shaft 230 and second electric machine 132 when disconnect clutch 224 is disengaged. Gear 223 rotates with shaft 230 and second electric machine 132 when disconnect clutch 224 is engaged. Thus, second electric machine 132 may be mechanically coupled to transmission 135 when disconnect clutch 224 is closed. Second electric machine 132 may be mechanically decoupled from transmission 135 when disconnect clutch 224 is open.

Vehicle propulsion system 199 also includes a mechanical power take-off 204 that may be mechanically coupled to a device 202 that is external to the vehicle propulsion system 199. In particular, mechanical device 202 may consume mechanical power from power take-off 204. Alternatively, mechanical device 202 may provide power to power take-off 204. Power take-off 204 may be selectively coupled to gear 222 via power take-off disconnect clutch 206. Gear 222 meshes with gear 208 and gear 208 is mechanically coupled to shaft 230 and second electric machine 132.

Power take-off 204 may be activated so that mechanical device 202 rotates at a rate that is proportionate to the rate of rotation of the second electric machine 132. Power take-off may be activated by closing power take-off disconnect clutch 206. Power take-off 204 may be activated while disconnect clutch 224 is open or closed. If disconnect clutch 224 is closed, second electric machine 132 may rotate at a rate that is proportionate to the rate of rotation of first electric machine 105. Thus, second electric machine 132 may deliver or receive mechanical power solely to/from device 202, solely to/from transmission 135, or to/from both transmission 135 and device 202. Transmission 135 is mechanically coupled to differential gear set 106 of FIG. 1 via shaft 208.

The system of FIGS. 1 and 2 provides for an electric propulsion system, comprising: a first electric machine; a second electric machine; a transmission, the transmission mechanically coupled to one or more rotatable wheels and the first electric machine; a disconnect clutch configured to selectively couple the second electric machine to the transmission; a power take-off configured to supply rotational mechanical power to a device; a power take-off disconnect clutch configured to selectively couple the second electric machine to the power take-off; and one or more controllers, the one or more controllers including executable non-transitory executable instructions that cause the controller to operate the power take-off disconnect clutch and the disconnect clutch. In a first example, the electric propulsion system includes where the power take-off disconnect clutch and the disconnect clutch are operated in response to a relationship between tractive effort and vehicle speed. In a second example that may include the first example, the electric propulsion system includes where the transmission includes a first gear and a second gear. In a third example that may include one or both of the first and second examples, the electric propulsion system further comprises additional executable instructions that cause the one or more controllers to engage the first gear and disengage the second gear in response to a first vehicle operating condition, and additional executable instructions that cause the one or more controllers to engage the second gear and disengage the first gear in response to a second vehicle operating condition. In a fourth example that may include one or more of the first through third examples, the electric propulsion system further comprises additional executable instructions that cause the one or more controllers to engage the power take-off via closing the power take-off disconnect clutch and opening the disconnect clutch in response to a power take-off request and a tractive effort request. In a fifth example that may include one or more of the first through fourth examples, the electric propulsion system further comprises additional executable instructions that cause the one or more controllers to disengage the power take-off via opening the power take-off disconnect clutch and closing the disconnect clutch in response to a power take-off request and a tractive effort request. In a sixth example that may include one or more of the first through fifth examples, the electric propulsion system further comprises additional executable instructions that cause the one or more controllers to fully open the disconnect clutch from a closed position in response to vehicle speed exceeding a threshold speed. In a seventh example that may include one or more of the first through sixth examples, the electric propulsion system further comprises additional executable instructions that cause the one or more controllers to fully open the disconnect clutch from a closed position in response to vehicle speed being less than a threshold speed.

The system of FIGS. 1 and 2 also provides for an electric propulsion system, comprising: a first electric machine; a second electric machine; a transmission, the transmission mechanically coupled to one or more rotatable wheels and the first electric machine; a disconnect clutch configured to selectively couple the second electric machine to the transmission; a power take-off configured to supply rotational mechanical power to a device; a power take-off disconnect clutch configured to selectively couple the second electric machine to the power take-off; and one or more controllers, the one or more controllers including executable non-transitory executable instructions that cause the controller to open the disconnect clutch in response to increasing driver demand torque when a vehicle speed is greater than a threshold speed, and additional executable instructions that cause the controller to open the disconnect clutch in response to increasing driver demand torque when the vehicle speed is less than the threshold speed. In a first example, the electric propulsion system further comprises additional executable instructions that cause the controller to engage a first gear of the transmission in response to tractive effort and the vehicle speed. In a second example that may include the first example, the electric propulsion system further comprises additional executable instructions that cause the controller to engage a second gear of the transmission in response to tractive effort and the vehicle speed. In a third example that may include one or both of the first and second examples, the electric propulsion system further comprises additional executable instructions that indicate the power take-off being automatically deactivated or automatically activated. In a fourth example that may include one or more of the first through third examples, the electric propulsion system further comprises additional executable instructions that indicate second electric machine being automatically deactivated or automatically activated.

Turning now to FIG. 3, a plot 300 showing a relationship between tractive effort, vehicle speed, and powertrain operating mode is shown. Plot 300 includes a vertical axis and a horizontal axis. The vertical axis represents tractive effort, which has units of kilo-Newtons (kN), and the horizontal axis represents vehicle speed, which has units of kilo-meters per hour (kph).

In plot 300, the vehicle operating range is comprised of four operating regions (302-308). The first operating region 302 includes low vehicle speeds and relatively high tractive effort levels. In the first operating region 302, the power take-off is disconnected from the second electric machine. Additionally, the first electric machine 105 and the second electric machine 132 are mechanically coupled to gears of transmission 135 so that they both may source or receive power to/from transmission 135. The disconnect clutch 224 is fully closed and the power take-off disconnect clutch 206 is fully open. The vehicle is engaged in first (e.g., low) gear. A vehicle may operate in the first operating region 302 when it is temporarily stuck, driving out of a pothole, or beginning to move a heavy load.

The second operating region 304 includes low to medium vehicle speeds and low to medium tractive effort levels. In the second operating region 304, the power take-off may be connected and the first electric machine 105 is the sole electric machine that is mechanically coupled to gears of transmission 135. The second electric machine 132 is mechanically decoupled from gears of transmission 135 so that first electric 105 is the sole propulsion source in this operating region. The power take-off disconnect clutch 206 is fully closed and the vehicle is engaged in first (e.g., low) gear. A vehicle may operate in the second operating region 304 when a vehicle is approaching or backing away from an area where the power take-off may be put to work (e.g., lifting a container or a dump bed) where power take-off use may be desirable. Thus, the power take-off may be engaged and operating in second operating region 304.

The third operating region 306 includes medium to high vehicle speeds and low to low-medium tractive effort levels. In the third operating region 306, the power take-off is disconnected and the first electric machine 105 and the second electric machine 132 are mechanically coupled via gears of transmission 135 so that both the first electric machine 105 and the second electric machine 132 may provide tractive effort to the vehicle's wheels. The power take-off disconnect clutch 206 is fully open and the disconnect clutch 224 is fully closed. The vehicle is engaged in second (e.g., high) gear. A vehicle may operate in the third operating region 306 when a vehicle is operating at higher speeds, such as when the vehicle is traveling in a straight line or on a straight road.

The fourth operating region 308 includes medium to high vehicle speeds and low tractive effort levels. In the fourth operating region 308, the power take-off may be connected and the first electric machine 105 is the sole electric machine that is mechanically coupled to gears of transmission 135. The second electric machine 132 is mechanically decoupled from gears of transmission 135 so that first electric 105 is the sole propulsion source in this operating region. The power take-off disconnect clutch 206 is fully closed and the vehicle is engaged in second (e.g., high) gear. A vehicle may operate in the fourth operating region 308 when a vehicle is traveling in a straight line and some power take-off power may be desired, such as when a mixer is working onboard the vehicle and the vehicle is on its way to drop off a mixture.

Figure 4:
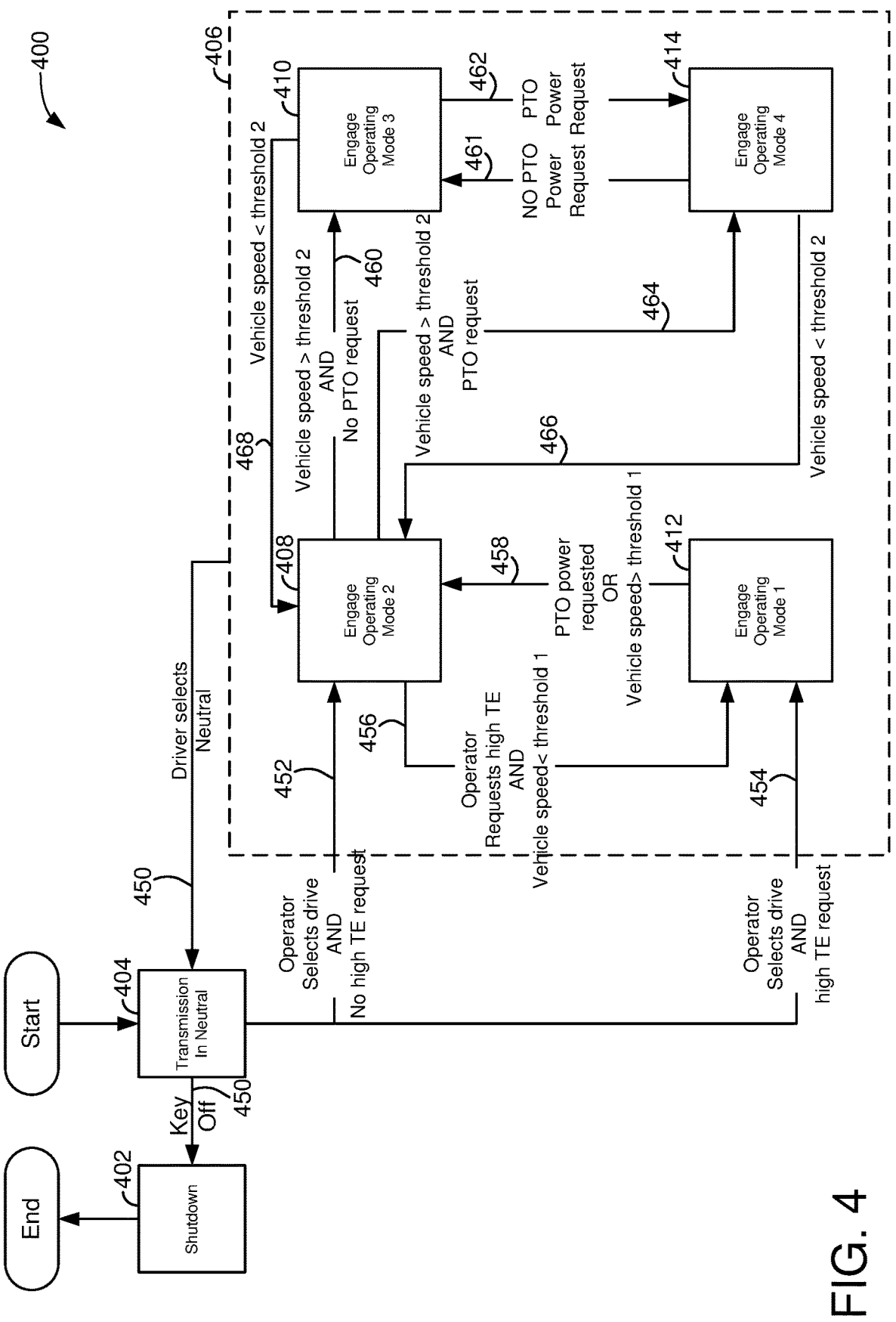
FIG. 4 shows a block diagram of an example method for operating an electric vehicle.
Figure 5:
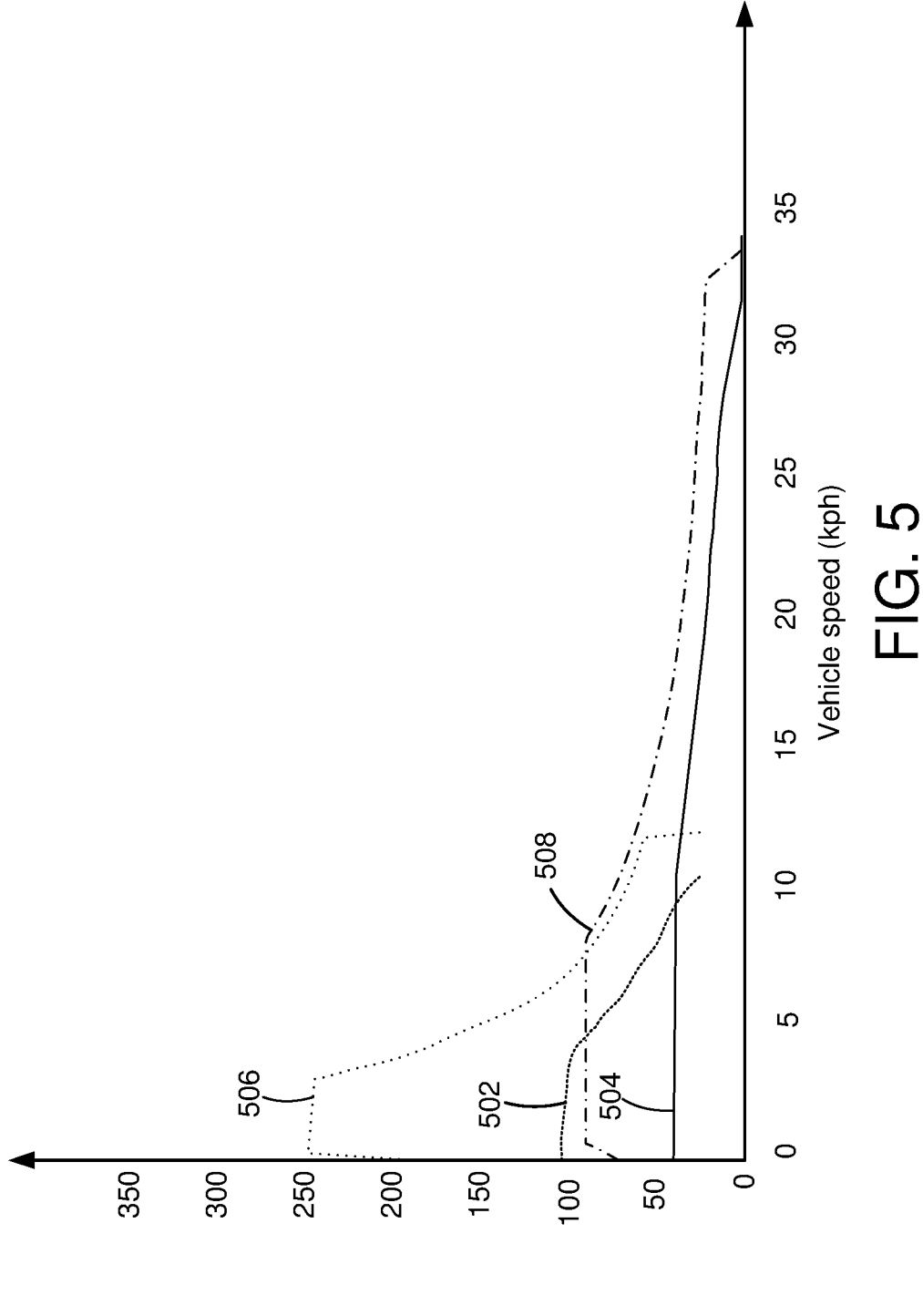
FIG. 5 shows available tractive effort levels for an example electric vehicle having a two speed transmission.

Referring now to FIG. 4, a block diagram of a method 400 for operating an electric vehicle with a power take-off is shown. The method of FIG. 4 may be incorporated into and may cooperate with the system of FIGS. 1 and 2. Further, at least portions of the method of FIG. 4 may be incorporated as executable instructions stored in non-transitory memory of one or more controllers while other portions of the method may be performed via the one or more controllers transforming operating states of devices and actuators in the physical world. Block 406 represents a drive mode and the drive mode includes modes 1-4.

At 404, method 400 is in an operating state where the vehicle's transmission is engaged in neutral or park. The vehicle may not move in a forward or reverse direction when the vehicle's transmission is engaged in neutral or park. The vehicle may be activated when the vehicle is in neutral or park.

Method 400 may move to a shutdown operating state at block 402 from block 404 as indicated by leader 450 in response to a vehicle key off, movement of a vehicle activation device away from the vehicle, or another signal that is an indication of a desire or request to shut down or deactivate the vehicle. The vehicle may be shutdown by ceasing to supply electric power to the vehicle's traction motors and inverters. Method 400 proceeds to exit after the vehicle is shutdown. Alternatively, method 400 may move to block 412 as indicated by leader 454 in response a request for the vehicle's transmission to enter drive and a tractive effort request that is greater than a first tractive effort threshold.

At block 412, the vehicle enters a first operating mode where the vehicle may operate in a first operating region 302 as shown in FIG. 3. In the first operating mode, the disconnect clutch 224 is fully closed and the power take-off clutch 206 is fully open. This operating mode allows the vehicle to operate at low speed and high tractive effort. The vehicle may remain in first gear in this operating mode. Method 400 may exit block 412 and move to block 408 in response to power take-off (PTO) power being requested or vehicle speed being greater than a first threshold vehicle speed.

Method 400 may move to block 408 from block 404 as indicated by leader 452 in response to a request for the vehicle's transmission to enter drive and the tractive effort request being less than the first tractive effort threshold. At block 408, the vehicle enters a second operating mode where the vehicle may operate in a second operating region 304 as shown in FIG. 3. In the second operating mode, the disconnect clutch 224 is fully open and the power take-off clutch 206 may be fully closed if there is a request for power take-off activation. This operating mode allows the vehicle to operate at low speed with an activated power take-off. The vehicle may remain in first gear in this operating mode. Block 408 may also be entered in response to a power take-off request while the vehicle is operating in the first operating mode or when vehicle speed is greater than a first threshold vehicle speed as indicated by leader 458. Further, block 408 may also be entered in response to vehicle speed being less than a second threshold speed when the vehicle is at block 410 and operating in a third mode as indicated by leader 468. Further still, block 408 may be entered in response to vehicle speed being less than a second threshold speed when the vehicle is at block 414 and operating in a fourth mode as indicated by leader 466.

Method 400 may exit block 408 and move to block 412 in response to a vehicle operator requesting a tractive effort (TE) that is greater than a threshold tractive effort and vehicle speed being less than a threshold vehicle speed as indicated at leader 456. Method 400 may be in first gear when method 400 is at blocks 408 and 412. Method 400 may also exit block 408 and move to block 410 in response to a vehicle speed being greater than a second threshold vehicle speed and no power take-off (PTO) request as indicated at leader 460. Method 400 may enter second gear when method 400 moves to 410. Additionally, method 400 may also exit block 408 and move to block 414 in response to a vehicle speed being greater than a second threshold vehicle speed and a power take-off (PTO) request as indicated at leader 464. Method 400 may enter second gear when method 400 moves to 414.

At block 410, the vehicle enters a third operating mode where the vehicle may operate in a third operating region 306 as shown in FIG. 3. In the third operating mode, the disconnect clutch 224 is fully closed and the power take-off clutch 206 is fully open. This operating mode allows the vehicle to operate at higher speed and low to medium tractive effort without an engaged power take-off. The vehicle may engage second gear in this operating mode. Method 400 may exit block 410 and move to block 414 as indicated by leader 462 in response to power take-off (PTO) power being requested as indicated by leader 462. Method 400 may also exit block 410 and move to block 408 as indicated by leader 468 in response to a vehicle speed being less than a second threshold vehicle speed.

At block 414, the vehicle enters a fourth operating mode where the vehicle may operate in a fourth operating region 308 as shown in FIG. 3. In the fourth operating mode, the disconnect clutch 224 is fully open and the power take-off clutch 206 may be fully closed if there is a request for power take-off activation. This operating mode allows the vehicle to operate at higher speeds with an activated power take-off. The vehicle may engage second gear in this operating mode. Block 414 may be exited as indicated by leader 461 in response to no power take-off request. Further, method 400 may exit block 414 and enter block 408 as indicated by leader 466 in response to vehicle speed being less than a second threshold vehicle speed.

In this way, a vehicle that includes two electric machines and a power take-off may be operated. The method of FIG. 4 allows the vehicle to switch operating modes in a way that allows both power take-off requests and tractive effort demands to be met.

Method 400 provides for a method for operating a vehicle, comprising: selectively opening and closing a disconnect clutch and a power take-off disconnect clutch that are mechanically coupled to a second electric machine in response to a tractive effort and a vehicle speed; and propelling the vehicle via a first electric machine. In a first example, the method includes where the disconnect clutch selectively couples the second electric machine to a transmission and the first electric machine, and where the first electric machine is mechanically coupled to the transmission. In a second example that may include the first example, the method further comprises selectively engaging the power take-off clutch in response to a power take-off request. In a third example that may include one or both of the first and second examples, the method further comprises indicating disengagement of the power take-off clutch when the power take-off clutch is disengaged in response to vehicle speed. In a fourth example that may include one or more of the first through third examples, the method further comprises indicating engagement of the power take-off clutch when the power take-off clutch is engaged in response to vehicle speed. In a fifth example that may include one or more of the first through fourth examples, the method further comprises indicating disengagement of the disconnect clutch in response to vehicle speed. In a sixth example that may include one or more of the first through fifth examples, the method further comprises indicating engagement of the disconnect clutch in response to vehicle speed.

Referring now to FIG. 5, a plot 500 showing a relationship between tractive effort that is available while the transmission is engaged in its different gears versus vehicle speed is shown. Plot 500 includes a vertical axis and a horizontal axis. The vertical axis represents tractive effort, which has units of kilo-Newtons (kN), and the horizontal axis represents vehicle speed, which has units of kilo-meters per hour (kph).

In plot 500, maximum tractive effort values that are available while the vehicle's transmission is engaged in first or second gear are shown. In particular, dashed line 502 represents vehicle speeds and a maximum continuous amount of tractive effort that is available from the powertrain of FIGS. 1 and 2 while the vehicle is engaged in first gear and one sole electric machine is mechanically coupled to the driveline and wheels. Solid line 504 represents vehicle speeds and a maximum continuous amount of tractive effort that is available from the powertrain of FIGS. 1 and 2 while the vehicle is engaged in second gear and one sole electric machine is mechanically coupled to the driveline to provide tractive effort at the wheels. Dotted line 506 represents vehicle speeds and a maximum peak or transient amount of tractive effort that is available from the powertrain of FIGS. 1 and 2 while the vehicle is engaged in first gear and one sole electric machine is mechanically coupled to the driveline to provide tractive effort at the wheels. Dash-dot line 508 represents vehicle speeds and a maximum peak or transient amount of tractive effort that is available from the powertrain of FIGS. 1 and 2 while the vehicle is engaged in second gear and one sole electric machine is mechanically coupled to the driveline to provide tractive effort at the wheels.

From the lines in FIG. 5, it may be observed that the transmission may be shifted from first gear to second gear when vehicle speed exceeds a maximum vehicle speed achievable with dotted line 506. Further, it may be observed that the transmission may be shifted from second gear to first gear when a tractive effort demand exceeds a maximum tractive effort achievable with dash-dot line 508.

Note that the example control and estimation routines included herein may be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. Thus, the described actions, operations and/or functions may graphically represent code to be programmed into non-transitory memory of the computer readable storage medium in the vehicle and/or transmission control system. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it is to be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology may be applied to electric vehicles and hybrid vehicles including induction and synchronous electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric propulsion system, comprising:
a first electric machine;
a second electric machine;
a transmission, the transmission mechanically coupled to one or more rotatable wheels and the first electric machine;

a disconnect clutch configured to selectively couple the second electric machine to the transmission;

a power take-off configured to supply rotational mechanical power to a device;

a power take-off disconnect clutch configured to selectively couple the second electric machine to the power take-off; and one or more controllers, the one or more controllers including executable non-transitory executable instructions that cause the one or more controllers to operate the power take-off disconnect clutch and the disconnect clutch.

2. The electric propulsion system of claim 1, where the power take-off disconnect clutch and the disconnect clutch are operated in response to a relationship between tractive effort and vehicle speed, wherein the second electric machine is decoupled from the transmission while coupled to the power take-off when the disconnect clutch is fully open and the power take-off clutch is fully closed.

3. The electric propulsion system of claim 1, where the transmission includes a first gear and a second gear.

4. The electric propulsion system of claim 3, further comprising additional executable instructions that cause the one or more controllers to engage the first gear and disengage the second gear in response to a first vehicle operating condition, and additional executable instructions that cause the one or more controllers to engage the second gear and disengage the first gear in response to a second vehicle operating condition.

5. The electric propulsion system of claim 4, further comprising additional executable instructions that cause the one or more controllers to engage the power take-off via closing the power take-off disconnect clutch and opening the disconnect clutch in response to a power take-off request and a tractive effort request.

6. The electric propulsion system of claim 4, further comprising additional executable instructions that cause the one or more controllers to disengage the power take-off via opening the power take-off disconnect clutch and closing the disconnect clutch in response to a power take-off request and a tractive effort request.

7. The electric propulsion system of claim 1, further comprising additional executable instructions that cause the one or more controllers to fully open the disconnect clutch from a closed position in response to vehicle speed exceeding a threshold speed.

8. The electric propulsion system of claim 1, further comprising additional executable instructions that cause the one or more controllers to fully open the disconnect clutch from a closed position in response to vehicle speed being less than a threshold speed.

9. A method for operating a vehicle, comprising:

selectively opening and closing a disconnect clutch and a power take-off disconnect clutch that are mechanically coupled to a second electric machine in response to a tractive effort and a vehicle speed; and propelling the vehicle via a first electric machine.

10. The method of claim 9, where the disconnect clutch selectively couples the second electric machine to a transmission and the first electric machine, and where the first electric machine is mechanically coupled to the transmission.

11. The method of claim 10, further comprising selectively engaging the power take-off disconnect clutch in response to a power take-off request.

12. The method of claim 11, further comprising indicating disengagement of the power take-off disconnect clutch when the power take-off disconnect clutch is disengaged in response to vehicle speed.

13. The method of claim 11, further comprising indicating engagement of the power take-off disconnect clutch when the power take-off disconnect clutch is engaged in response to vehicle speed.

14. The method of claim 11, further comprising indicating disengagement of the disconnect clutch in response to vehicle speed.

15. The method of claim 11, further comprising indicating engagement of the disconnect clutch in response to vehicle speed.

16. An electric propulsion system, comprising:

a first electric machine;

a second electric machine;

a transmission, the transmission mechanically coupled to one or more rotatable wheels and the first electric machine;

a disconnect clutch configured to selectively couple the second electric machine to the transmission;

a power take-off configured to supply rotational mechanical power to a device;

a power take-off disconnect clutch configured to selectively couple the second electric machine to the power take-off; and one or more controllers, the one or more controllers including executable non-transitory executable instructions that cause the one or more controllers to open the disconnect clutch in response to increasing driver demand torque when a vehicle speed is greater than a threshold speed, and additional executable instructions that cause the one or more controllers to open the disconnect clutch in response to increasing driver demand torque when the vehicle speed is less than the threshold speed.

17. The electric propulsion system of claim 16, further comprising additional executable instructions that cause the one or more controllers to engage a first gear of the transmission in response to tractive effort and the vehicle speed.

18. The electric propulsion system of claim 17, further comprising additional executable instructions that cause the one or more controllers to engage a second gear of the transmission in response to tractive effort and the vehicle speed.

19. The electric propulsion system of claim 16, further comprising additional executable instructions that indicate the power take-off being automatically deactivated or automatically activated.

20. The electric propulsion system of claim 16, further comprising additional executable instructions that indicate second electric machine being automatically deactivated or automatically activated.

* * * * *